J. W. CARPENTER.
HARROW.

No. 192,414. Patented June 26, 1877.

WITNESSES:
E. Wolff
J. H. Scarborough

INVENTOR:
J. W. Carpenter.
BY
ATTORNEYS.

UNITED STATES PATENT OFFICE.

JOHN W. CARPENTER, OF BRIDGEWATER, VIRGINIA.

IMPROVEMENT IN HARROWS.

Specification forming part of Letters Patent No. 192,414, dated June 26, 1877; application filed May 12, 1877.

*To all whom it may concern:*

Figure 1:
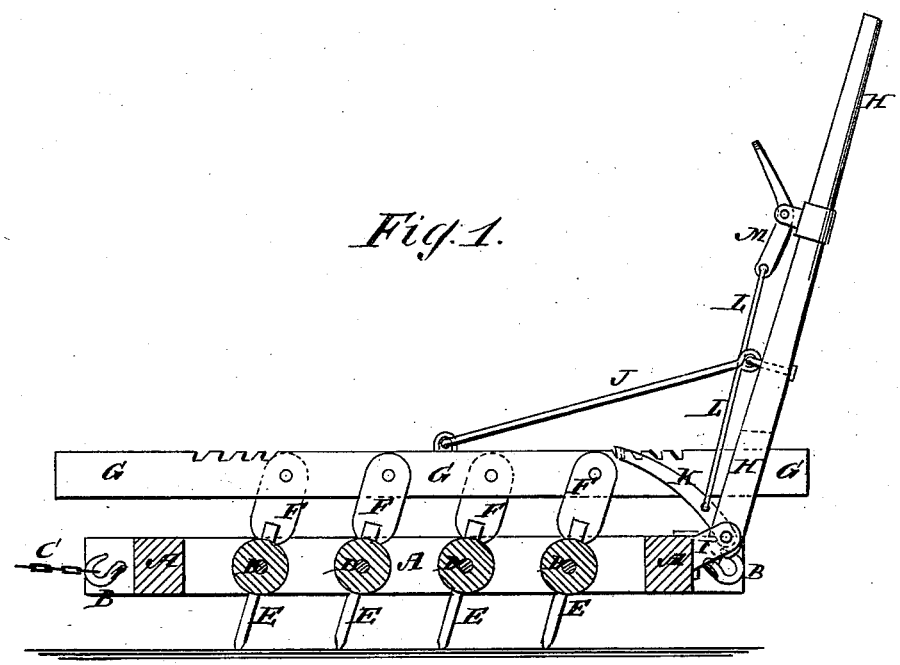
Figure 2:
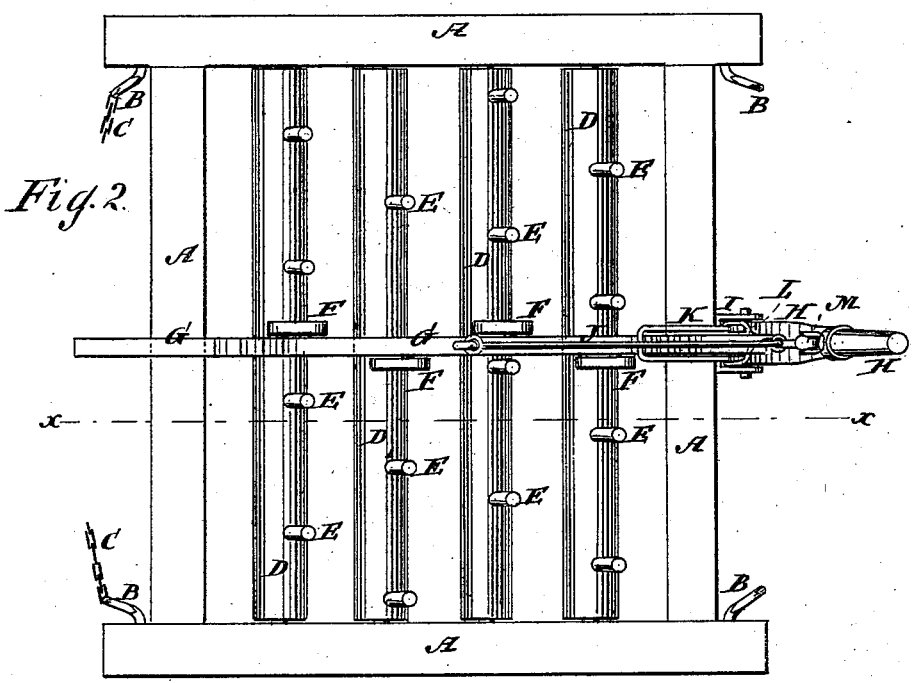

Be it known that I, JOHN WESLEY CARPENTER, of Bridgewater, in the county of Rockingham and State of Virginia, have invented a new and useful Improvement in Harrows, of which the following is a specification:

Figure 1 is a vertical longitudinal section of my improved harrow taken through the line $x\ x$, Fig. 2, and showing the teeth inclined forward. Fig. 2 is a top view of the same.

Similar letters of reference indicate corresponding parts.

The object of this invention is to furnish an improved harrow, which shall be so constructed that the teeth may be adjusted vertical, at a forward inclination, or at a rearward inclination, without stopping the team, and which shall be simple in construction and convenient in use.

The invention will first be described in connection with the drawing, and then pointed out in the claim.

A represents the main frame of the harrow, which consists of two side bars connected near their ends by two cross-bars.

To the inner side of the projecting ends of each side bar of the frame A is attached a hook, B, to receive the ends of the draw-chain C, to the center of which the draft is applied. This construction enables the draft to be changed from one side to the other, so that the wear may keep the teeth sharp. The frame A may be made of any desired size, and to its side bars are pivoted the ends of four, more or less, rollers, D, to which the teeth E are attached.

To the middle parts of the rollers D are rigidly attached arms F, to the upper ends of which is pivoted a bar, G, so that all the rollers D may be adjusted at the same time by adjusting the said bar G.

H is a lever, the lower end of which is pivoted to a bracket, I, attached to the center of a cross-bar of the frame A.

J is a brace-rod, the forward end of which is pivoted to the center of the bar G, and its rear end is pivoted to the middle part of the lever H, so that by drawing the upper end of the lever H to the rearward the bar G may be drawn back, and the rollers D turned to bring the teeth E from a rearwardly-inclined to a vertical position, and from a rearwardly-inclined or vertical position to a forwardly-inclined position, without stopping the team. The lower part of the lever H is slotted for the end of the bar G to pass through.

K is a U-pawl, which straddles the bar G, and engages with notches in the upper side of the bar G, so as to hold said bar securely in any position into which it may be adjusted. The ends of the U-pawl K are pivoted to the bolt that pivots the lever H to the bracket I.

To the U-pawl K is pivoted the lower end of the rod L, the upper end of which is pivoted to the end of the bent lever M. The lever M is pivoted at its angle to the lever H, so that by operating the lever M the pawl K will be raised from the bar G, allowing the pressure of the ground against the teeth E to turn said teeth into a rearwardly-inclined position, so that any trash or rubbish that may have lodged upon the teeth may slide off and thus clear the teeth. When the teeth are clear the lever H may be operated to bring the teeth back into their former position without its having been necessary to stop the team. Notches to receive the pawl K are formed upon both ends of the bar G, and when it is desired to attach the team to the other side of the harrow the bracket I and its attachments are detached, and are attached to the other cross-bar of the frame A, where they will operate in the manner hereinbefore described.

Having thus described my invention, I claim as new and desire to secure by Letters Patent—

The combination, with bar G having rack at either end, of the lever and pawl mechanism, connected with said bar by the pivoted brace J, and arranged in a detachable bracket, I, to allow the harrow to be reversed, as specified.

JOHN WESLEY CARPENTER.

Witnesses:
T. H. B. BROWN,
M. STRICKLER.